United States Patent Office 3,515,440
Patented June 2, 1970

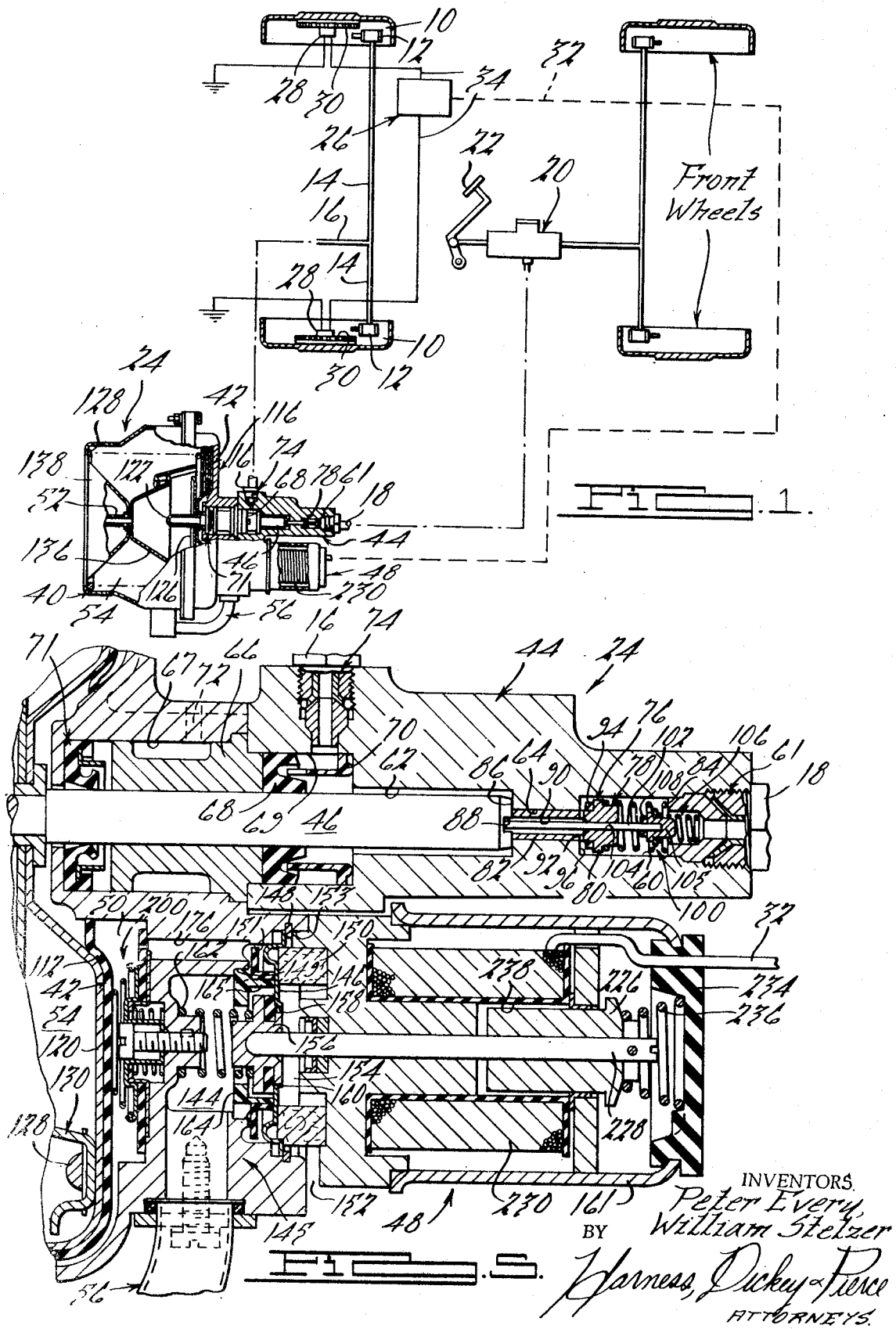

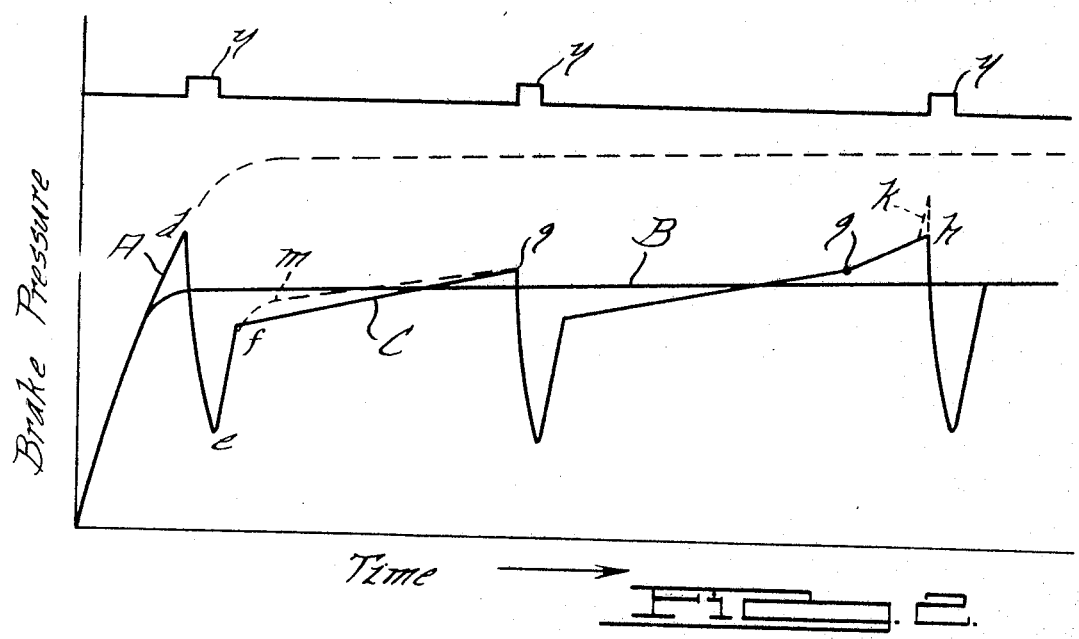
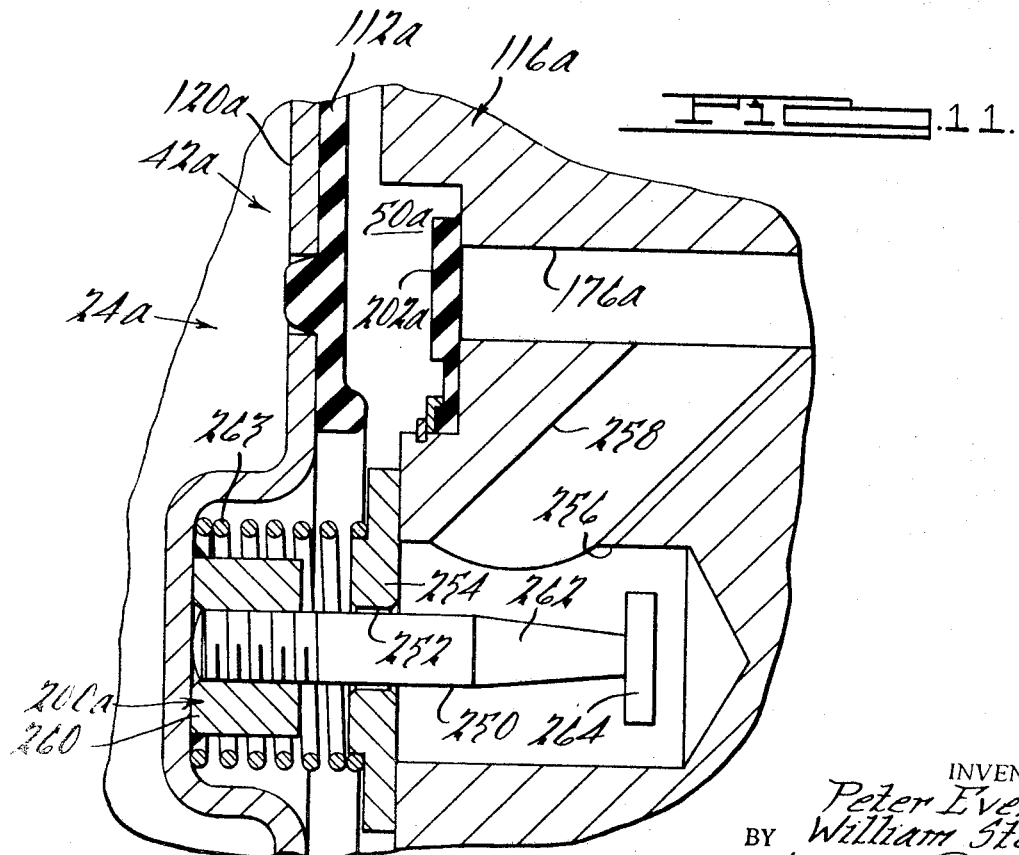

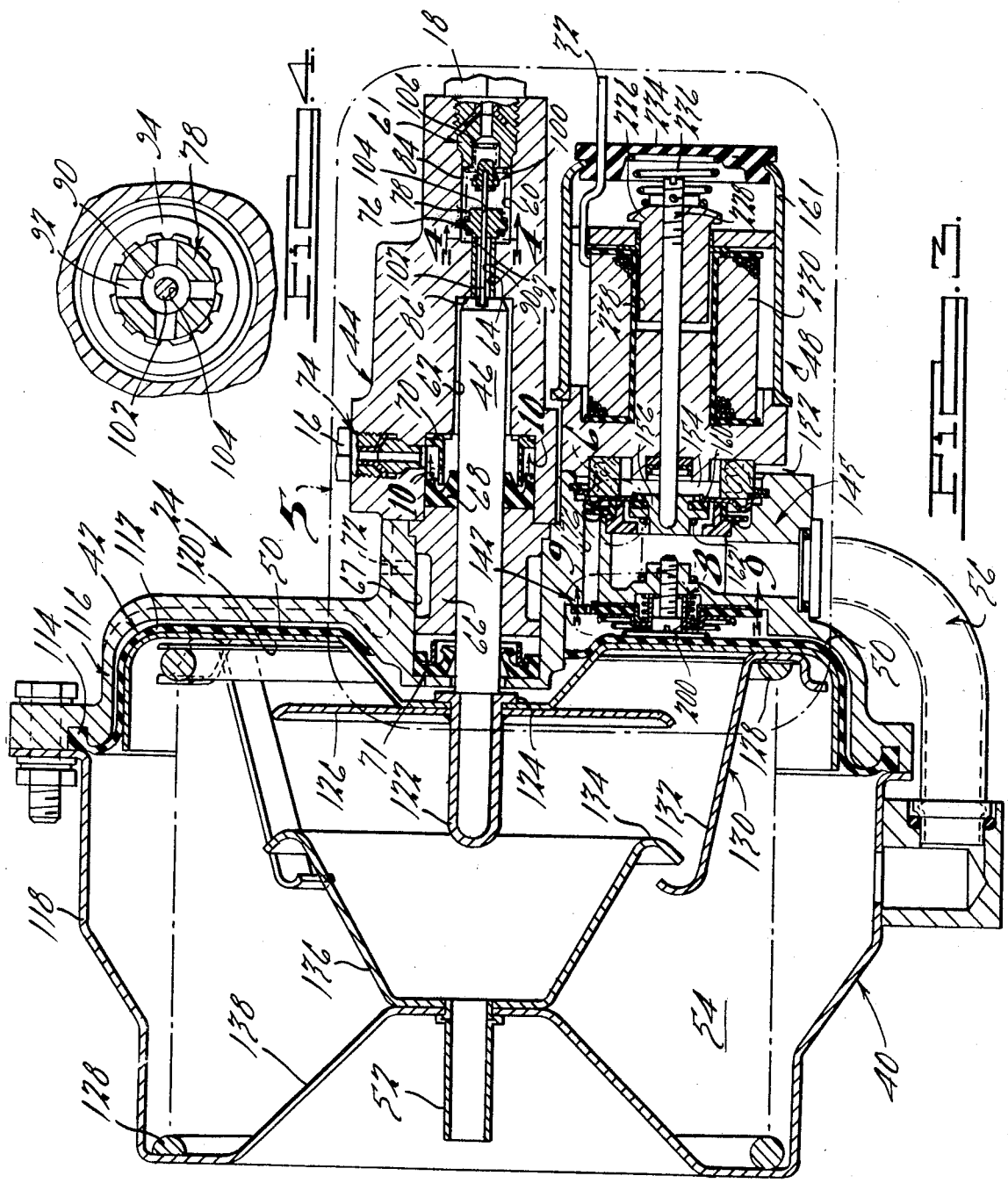

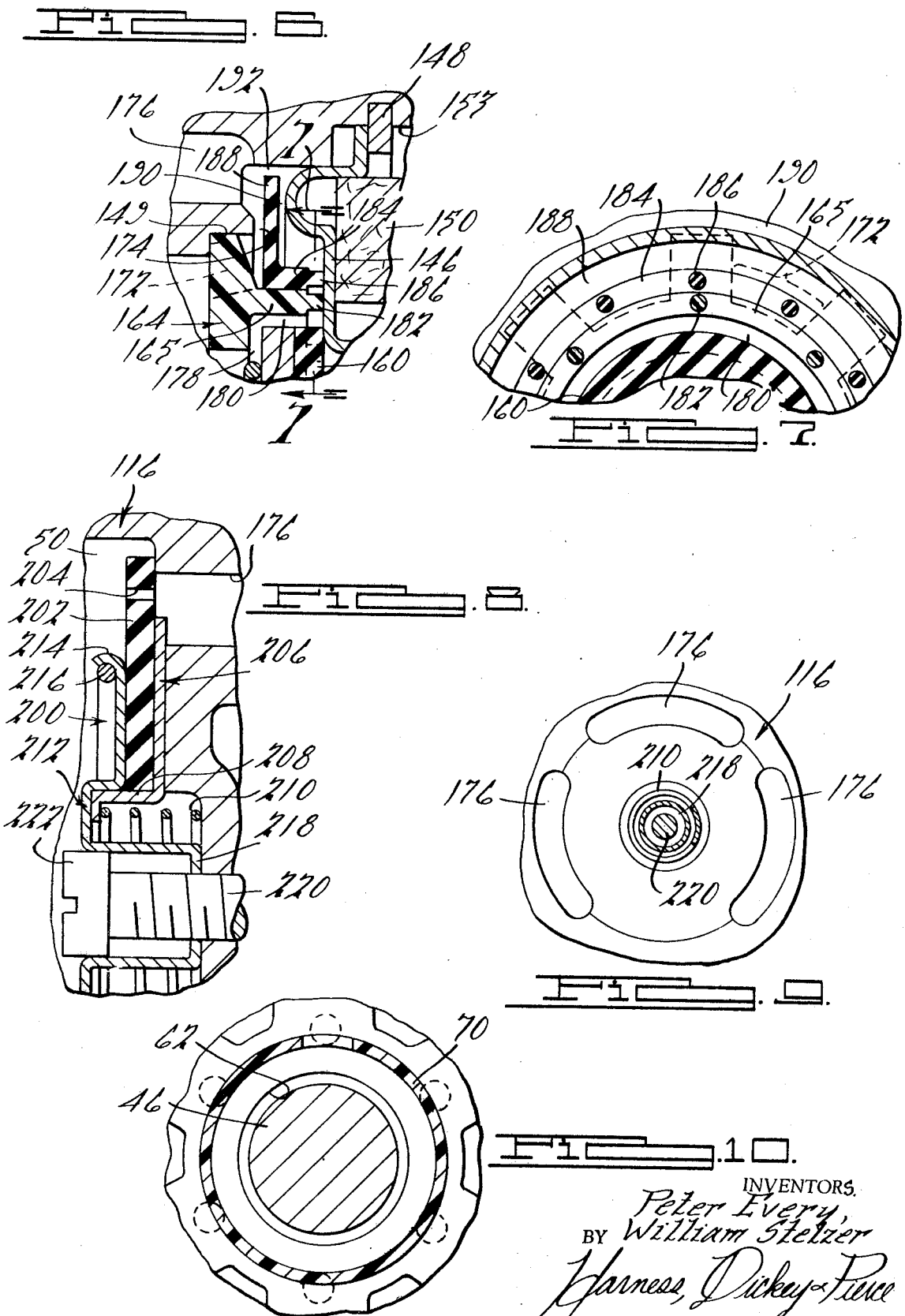

3,515,440
SKID CONTROL SYSTEM INCLUDING
HYDRAULIC MODULATING VALVE
Peter Every, Livonia, and William Stelzer, Bloomfield
Hills, Mich., assignors to Kelsey-Hayes Company,
Romulus, Mich., a corporation of Delaware
Continuation of application Ser. No. 642,861, June 1,
1967. This application July 10, 1969, Ser. No. 842,825
Int. Cl. B60t 8/06
U.S. Cl. 303—21                                    19 Claims

ABSTRACT OF THE DISCLOSURE

A skid control system for fluid actuated brakes of a wheeled vehicle including a modulating valve actuable by a skid control signal for modulating the fluid pressure to the fluid actuated brakes. The modulating valve includes a bleed valve to permit additional fluid at a substantially restricted rate to be transmitted to the brakes after the skid condition is relieved.

This application is a continuation of Ser. No. 642,861 filed June 1, 1967, now abandoned.

The present invention relates to skid control systems, and more particularly relates to a skid control system including a novel control or modulating valve.

It is an object of the present invention to provide a novel skid control system for controlling the brakes of the wheels of a wheeled vehicle.

It is another object of the present invention to provide a novel modulating or control valve for use in a skid control system for controlling the brakes of the wheels of a wheeled vehicle.

It is another object of the present invention to provide a novel skid control system for fluid actuated brakes for wheels of a wheeled vehicle including a novel modulating or control valve for modulating or controlling the pressure to the brakes in response to an electrical signal indicating the occurrence or the imminence of a wheel skid condition.

Other objects, features, and advantages of the present invention will become apparent from the subsequent description and the appended claims, taken in conjunction with the accompanying drawings, in which:

FIG. 1 is a generally schematic diagram of a skid control system embodying features of the present invention;

FIG. 2 is a graphical representation of the fluid brake pressure versus time and includes a curve of the electrical control signal;

FIG. 3 is a sectional view of the modulating valve of the system of FIG. 1;

FIG. 4 is a sectional view to enlarged scale of the valve of FIG. 3 taken substantially along the line 3—3;

FIG. 5 is an enlarged view of that portion of the valve of FIG. 3 included on the dot-dashed lines indicated by the numeral 5;

FIG. 6 is an enlarged view of that portion of the valve of FIG. 3 included in the dot-dashed lines indicated by the numeral 6;

FIG. 7 is a sectional view of the apparatus of FIG. 6 taken substantially along the line 7—7;

FIG. 8 is an enlarged view of that portion of the valve of FIG. 3 included in the dot-dashed lines indicated by the numeral 8;

FIG. 9 is a sectional view to enlarged scale of the valve of FIG. 3 taken substantially along the line 9—9;

FIG. 10 is a sectional view to enlarged scale of the valve of FIG. 3 taken substantially along the line 10—10; and FIG. 11 is a fragmentary view depicting a modification of the valve of FIG. 3.

The skid control system of the present invention can be utilized and will be described specifically for use with an automotive vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automotive vehicle.

Looking now to FIG. 1, the schematic diagram generally shows the skid control system for use with the rear wheels of an automotive vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the fluid pressure to the wheel brake cylinders 12 and hence can control the operation of the brakes. The brakes associated with the brake drum 10 can be of a conventional construction and hence the details thereof have been omitted for the purposes of simplicity.

The modulating valve 24 in the present system is actuated in accordance with an electrical signal obtained from an electrical control module 26. The control module 26 receives information from sensors 28 associated with each of the brake drums 10 by means of exciter rings 30. The exciter rings 30 and sensors 28 can be of constructions known in the art and since the specific details thereof do not constitute a part of the present invention they have been omitted for the purposes of simplicity. The exciter rings 30 can be of a toothed construction and the sensors 28 can be of a permanent magnet or electromagnetic construction which together define a variable reluctance pickup. The exciter rings 30 would be rotated with the brake drums 10 and hence with the associated wheels, and by virtue of the toothed construction, could via sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with the brake drums 10 reaching a preselected magnitude corresponding to a skid condition existing or to be occurring at the wheels associated with drums 10. The output or control signal will be transmitted by means of conductor 32 to the modulating valve 24. In the system of the present invention the control module 26 can provide merely an "on" or "off" signal and modulation of the fluid pressure to the brake cylinders 12 will be provided by the modulating valve 24. In some skid control systems the fluid pressure to the brakes is varied in response to an electrical output signal of varying magnitude. In the present invention, the fluid pressure is varied by the valve 24, in response to a signal of generally constant amplitude which permits the remainder of the system to be simplified.

The skid control system of the present invention for fluid actuated brakes for braking of the vehicle varies or controls the fluid pressure to the brake system. Considering now a hydraulic system for the brakes on automotive vehicles, FIG. 2 is a graph showing the relationship between brake pressure and time. Curve A depicts the relationship of brake fluid pressure and time for a conventional brake system in which the pressure is increased from zero to the maximum fluid pressure available in the system. Under certain road conditions application of maximum brake pressure (or less) will result in excessive slip and a locked-wheel and/or skid condition. If the vehicle wheels are locked or are slipping excessively, the coefficient of friction between the surface of the road and the vehicle tire decreases and the effectiveness of the brake system in stopping the vehicle is substantially reduced. It has been theorized that the maximum coefficient of the friction and hence the most effective braking can be realized when the wheel slip is between 10 and 20%. Wheel slip has been defined as the ratio of the difference between car velocity (Vc) and braked wheel velocity (Vw) to car velocity (Vc) or (Vc—Vw)/Vc. The brake pressure curve for braking the vehicle at the desired slip and hence utilizing the maximum coefficient of friction is shown as curve B. Brake pressures slightly above curve B pressures will result in excessive wheel slip. It can be seen that the maximum pressure of curve B is less than the maximum obtainable pressure of the system (curve A) and hence indicates that relief from the maximum brake pressure is desirable in order to stop the vehicle in the shortest distance. It is a function of the system of the present invention to provide operational characteristics which will simulate or closely simulate the ideal brake pressure curve B. Note that depending upon the surface conditions the ideal curve B will vary; hence a family of ideal pressure curves could be constructed for different road conditions. For purposes of simplicity only one such curve has been shown.

In the system of the present invention, the modulating valve 24 in response to the output signals from the module 26 will provide for a modulated brake pressure curve C. The curve C approximates the ideal brake pressure curve B, i.e., for operation at between 10%–20% slip and hence provides characteristics for stopping the vehicle in the shortest possible distance. The curve X depicts the output from module 26 and shows the time relation between output control signals $y$ and pressure curve C.

In general the modulating valve 24 has a vacuum chamber housing 40 divided by a diaphragm assembly 42. A hydraulic cylinder housing 44 is mounted to the housing of the vacuum chamber housing 40 and has slidably located therein a hydraulic piston 46 which is mechanically linked to the diaphragm assembly 42. Mounted to one side of the hydraulic cylinder housing 44 is solenoid 48 whose plunger seats itself over an atmospheric air inlet port to shut off the introduction of atmospheric air pressure into one side 50 of the vacuum chamber housing 40 when no skid control is indicated. The vacuum housing chamber 40 is held at vacuum through engine (not shown) vacuum via engine vacuum line 52 which communicates to the other side 54 of the vacuum chamber 40. A conduit 56 and a normally opened vacuum port communicate the opposite side 50 to vacuum. When the control module 26 provides an output signal ($y$) indicating a skid condition energization of the solenoid 48 occurs and the solenoid plunger is unseated from the atmospheric air inlet port allowing atmospheric air pressure to enter the opposite side 50 of the chamber housing 40. At the same time the vacuum port is closed by actuation of solenoid 48. With the differential pressure created the diaphragm assembly 42 is moved permitting the hydraulic piston 46 to move. As the piston 46 moves the available volume within the hydraulic cylinder housing 44 increases and at the same time a check valve 76 is seated cutting off any further application of master cylinder pressure to the brakes of the wheels being skid controlled. The brake cylinder pressure which has already been built up will be relieved by flowing into the increased volume created in the hydraulic cylinder housing 44 by the movement therefrom of the hydraulic piston 46. With relief of brake cylinder pressure the associated wheel can spin up or increase in speed and the control module 26 will de-energize the solenoid 48 (signal $y$ terminates) allowing the plunger of solenoid 48 to return with the atmospheric air inlet port being closed again and the vacuum port to the one side 50 being opened. In this condition the piston 46 and diaphragm assembly 42 return towards their original positions. At the original position of piston 46, the check 76 is unseated permitting master cylinder pressure to be applied through the valve 24 directly to the brake cylinders 12.

The details of the modulating valve 24 can be seen in FIGS. 3 through 10. The hydraulic cylinder housing 44 is connected to a generally cup shaped chamber section 116 of the vacuum chamber housing 40 and has a first cylinder 60 which has one end connected to the hydraulic line 18 from the master cylinder 20 via a conventional fitting assembly 61. The cylinder 60 houses the check valve 76 and a bleeder valve 100 to be described. The first cylinder 60 is connected to a relief cylinder 62 in which is located the hydraulic piston 46. A bore 64 interconnects the cylinders 60 and 62 and is of a reduced diameter relative thereto. The relief cylinder 62 is connected in line with an enlarged bore 67 in the chamber section 116. A support bearing 66 is located in the bore 67 and extends partially into an enlarged portion 69 of the cylinder 62 and slidably supports the piston 46. The piston 46 extends into the relief cylinder 62 in radially clearance relation and is also extensible into the vacuum chamber housing 40. A hydraulic seal 68 is located adjacent bearing 66 at the end of the enlarged portion 69 of cylinder 62 and provides a fluid seal against the surface of the piston 46. At the inner end of the enlarged bore 67 is located a vacuum seal assembly 71 which prevents loss of vacuum from the one side 50 of the vacuum chamber housing 40. The enlarged bore 67 is vented to atmospheric via a port 72 and the atmospheric pressure is used to aid the seal 71 in its sealing function.

The fluid line 16 is connected in fluid communication with the enlarged portion 69 of relief cylinder 62 via hydraulic fitting assembly 74 and hence fluid to the brake cylinders 12 must pass from line 18 through cylinder 60, bore 64 and relief cylinder 62 to line 16.

The check valve assembly 76 is located in the cylinder 60 and bore 64 and includes a valve body 78 which has an enlarged head portion 80 located in the cylinder 60. A spring member 84 is in engagement with the enlarged head 80 and is biased to continuously urge the valve body 78 to a closed position. The valve body 78 has a stem portion 82 which extends into the bore 64 and partially into the cylinder 60. The hydraulic piston 46 is normally held in engagement against the annular shoulder 86 which is defined by the juncture of bore 64 and the relief cylinder 62. The end of the piston 46 has a radial cross slot 88 which is in communication with axial bore 90 extending through the valve body 78. The bore 90 is in communication with a radial cross port 92. In a normally deactuated condition of the modulating valve 24 with the piston 46 located against the shoulder 86, the spring 84 urges the valve body 78 toward the cylinder 62 with the stem 82 engaging the end of the piston 46. In this condition the cross port 92 is located within the confines of the cylinder 60 and thence communicates the cylinder 60 with the cylinder 62 via the bore 90 and radial slot 88. In this condition normal braking can be effectuated since fluid can freely pass from line 18 from the master cylinder 20 to line 16 to the wheel brake cylinders 12 via the modulating valve 24. Upon the occurrence of a skid condition whereby a skid control output signal ($y$) is derived from the control module 26, the piston 46 is moved outwardly from the relief cylinder 62 and the spring 84 moves the valve body 78 in the same direction moving the cross port 92 into the bore 64. At the end of travel an annular seal 94, located about the stem 82 against the head portion 80, is moved into engagement with the shoulder 96 of the cylinder 60 to substantially seal cylinder 60 from cylinder 62. At this point fluid from the master cylinder 20 to conduit 18 is generally cut off.

As previously noted a bleed valve assembly 100 is located in the cylinder 60 and is also actuated by the piston 46 and hence upon sufficient movement of piston 46 out of cylinder 62 the bleed valve assembly 100 will also be closed.

The bleed valve assembly 100 includes an elongated stem 102 which extends through the bore 90 in valve body 78 and is in close clearance with a reduced diameter bore portion 104 in the head 80 of valve body 78. The terminating end of the elongated stem 102 is generally located within the cross slot 88 in the end of the piston 46 when the valve assembly 100 is in its normally deactuated position as shown in FIG. 5. The opposite end of the elongated stem 102 is connected to a cap 105 which is engaged by a spring assembly 106 which urges the cap 105 and stem 102 in a direction towards the cylinder 62 to a closed position. The elongated stem 102 has a seal 108 located thereabout which, with the elongated stem 102 in its end actuated position, will engage the head 80 on the valve body 78 to close the clearance passage between the bore portion 104 and stem 102. In its actuated, closed position the stem 102 extends substantially beyond the end of stem portion 82 of the valve body 78 such that on the return of piston 46 the bleed valve assembly 100 will be opened before the check valve assembly 76; this serves a purpose to be later described. Since actuation of the piston 46 is rapid, closing of the main passage through the check valve assembly 76 and the closing of the secondary restricted passage through the bleed valve assembly 100 occur in relatively rapid succession.

As the hydraulic piston 46 is withdrawn from the cylinder 62 its available volume is increased whereby the fluid pressure in the cylinder 62 and in the line 16 and hence in the wheel brake cylinder 12 will be relieved. Relief of the fluid pressure will cause a decrease in the braking of the associated wheels hence permitting the wheels to spin up or to regain speed.

Looking now to FIG. 2, in operation brake pressure will be increased along the sloped portion of curve A until a skid condition occurs at point $d$; this condition will be sensed as previously described and control module 26 will transmit an output control signal $y$ to actuate the solenoid 48 whereby the piston 46 will be moved out of the cylinder 62 resulting in a decrease in the brake pressure from point $d$ to point $e$ (FIG. 2). At a point along the curve $d$ to $e$ the vehicle wheel will have spun up or regained speed whereby the output signal from the module 26 is terminated whereby the initial actuation of the modulating valve 24 by means of the solenoid 48 is discontinued. Note that the initial brake pressure at point $d$ was above the ideal pressure curve B and upon actuation of the modulating valve 24 the brake pressure dropped to a point below the ideal curve B. With the brake pressure above or below the curve B the maximum coefficient of friction for braking is not realized. It is a feature of the present invention that the modulating valve 24 is constructed to return the fluid pressure quickly to a point which is proximate to the ideal curve B and then to provide for a gradual increase of the fluid pressure along a gradually inclined curve, from point $f$ to point $g$. With the portion of the curve $f$ to $g$ generally approximating the shape of the curve B, nearly ideal brake pressure will be provided; this is accomplished by the construction to be described.

The piston 46 is freely sliding within the support bearing or bushing 66 and is actuated by the diaphragm assembly 42 located within the vacuum chamber housing 40. The assembly 42 includes a flexible diaphragm member 112 which has an annular outer bead 114 which is sealingly clamped between a flange on the chamber section 116 and a flange on a cap section 118. The sections 116 and 118 define the vacuum chamber housing 40. A generally cup-shaped power or diaphragm plate 120 is located in engagement with the diaphragm member 112, with the diaphragm member 112 being flexible and taking the shape of the power plate 120. The diaphragm assembly 42 further includes a flanged cap 122 which is located with a flange portion 124 engaging one side of a dished central portion of the power plate 120 and is held thereto by a stop plate 126 which is secured to the cap 122 on the opposite side of the dished portion of the power plate 120. The diaphragm assembly 42 divides the vacuum chamber housing 40 into the section 50 on one side and section 54 on the other side.

A coil spring 128 has one end in engagement with the cap section 118 and has its opposite end located in a spring retainer assembly 130. A plurality of spring hooks 132 are circumferentially spaced on retainer assembly 130 and, upon disassembly of cap section 118 from chamber section 116, will engage an annular lip portion 134 on a generally cup-shaped member 136 which is secured to an inwardly dished portion 138 at the rearward end of the cap section 118 thereby holding cap section 118, spring 128, and retainer assembly 130 together. Spring 128 is precompressed to bias the retainer assembly member 130 against the power plate 120 forcing that member to its extreme inner position in the vacuum chamber section 50. The cap 122 has a cavity which receives and engages the protruding end of the hydraulic piston 46. In the deactuated condition of valve 24, the spring 128 maintains the power plate 120 and hence the diaphragm 112 at its innermost position in section 50 of the vacuum chamber housing 40; at this innermost position, the hydraulic piston 46 by virtue of engagement with the cap 122 is held in engagement against the shoulder 86 of the relief cylinder 62. The bias of the spring 128 is selected to provide a preload of sufficient magnitude to overcome the maximum force on the piston 46 as the result of the maximum fluid pressure in the cylinder 62 acting on the end of the piston 46.

Vacuum line 52 is connected at the dished portion 138 in communication with the interior of vacuum chamber 54 at one side of diaphragm assembly 42. Upon actuation of the modulating valve 24, air pressure via the atmosphere is applied to the section 50 of the vacuum cylinder chamber housing 40. The area of the diaphragm assembly 42 is sufficient such that the air pressure will provide a force great enough to overcome the bias of spring 128 to move the diaphragm assembly 42 toward vacuum section 54 until the stop plate 126 engages the portion 134 of the cup member 136. At this point the maximum relief of the brake pressure to the brakes is obtained.

The conduit assembly 56 is in fluid communication with the vacuum section 54 and is connected to the vacuum and pressure port assemblies generally indicated by the numeral 142. The assembly 56 is connected to and in communication with a cavity 144 located in a port housing portion 145 which is a part of the chamber section 116. The cavity 144 terminates rearwardly in housing portion 145 in a plurality of stepped counterbores 149, 151, 153 of increasing diameters. A housing assembly 161 holds the solenoid 48 and is secured to the housing portion 145 of chamber section 116 with the solenoid 48 in line with cavity 144 and counterbores 149, 151, 153. The rearward end of cavity 144 is generally closed by an annular sealing member 146 held in counterbore 153 by a retaining washer 148 against the radially outer end surface of sealing member 146. An annular air filter member 150 is held against the radially outer end surface of the sealing member 146 by means of the housing assembly 161. An opening 152 between solenoid housing assembly 161 and housing portion 145 communicates atmosphere through filter 150 to a cylinder portion 154 defined by the air filter 150, the sealing member 146 and the end of the solenoid housing assembly 161. The sealing member 146 has a central opening 158 defining a port; a cap member 156 has a sealing member 160 held in sealing engagement with the inside surface around the central opening 158 by a coil spring 162 located in the cylinder 144. With the cap 156 in the position shown in FIG. 5 cylinder 144 is sealed from cylinder 154 and hence from atmospheric air pressure. An annular sealing member 164 is located in the counterbore 149 (see FIGS. 5 and 6) and generally has an annular portion 165 which concentrically receives at least a part of the cap 156. A flexible valve member 184 constructed of rubber or some other resilient material is located in counterbore 151 upon the annular portion 165 of member 164 and has an annular sealing flange 188 which is spaced away from the outer end of the counterbore 149 to define a fluid path 174 and is spaced away from the rearward end of the sealing washer 146 whereby a second fluid path 190 is defined. Since the sealing flange 188 is also spaced from the surface of counterbore 151 a clearance space 192 communicates paths 174 and 190.

Two paths from the cylinder 144 are defined by members 164 and 184. The member 164 has a peripheral radially outer surface edge provided with a plurality of circumferential slots 172 which communicate cylinder 144 with passage 174. Fluid passage 174 communicates with a plurality of slotted bores 176 (FIG. 9) which open into the vacuum section 50 in a manner to be described. The second path to the cylinder 144 includes the radially extending annular path 178 and the axially extending path 180 which are defined by the space between the cap 156 and member 164. The sealing member 164 has the extremity of its annular portion 165 in engagement with the adjacent surface of sealing washer 146 while the valve member 184 has its axially outer end similarly in engagement with washer 146. The paths 178, 180 communicate to path 190 through the spaces between the projections 182 and 186. The path 190 in turn communicates with bores 176 via path 192.

The bores 176 are in fluid communication with the vacuum section 50 through a throttling valve assembly 200. The throttling valve assembly has an annular flexible valve seal member 202 which is normally in sealing relationship with the bores 176. A small bleed hole 204 in the member 202 communicates between the section 50 and one of the bores 176 and hence to cylinder 144. An annular support member 206 holds and supports the annular flexible valve seal 202 and has a cup-shaped portion 208 in which is located a spring member 210 which engages the portion 208 and the inner surface of the chamber section 116 under a precompressive force. The spring 210 urges seal support 206 and seal valve 202 inwardly into the section 50. An annular spring retainer 212 has a radially outer lip 214 which holds a conical coil spring 216. Spring 216 extends into the section 50 and, with the diaphragn 112 located at its rearwardmost position, is in engagement therewith. The diaphragm assembly 110 compresses the spring 216 and holds the throttle valve assembly 200 in its closed position. The spring support 212 has a cup portion 218 at its center section; a screw member 220 is located within the cup portion 218 and is threaded into the chamber section 116 and has an enlarged head 222 which is movable within the cup portion 218, but which is engageable with the extremity thereof to limit the inner movement of throttle valve 200. With the modulating valve 24 deactuated (in a condition as shown in the drawings) the diaphragm assembly 42 will maintain the throttle valve 200 closed. However, vacuum from the section 54 is in communication with the section 50 by virtue of the fluid path as previously described and through the restriction 204.

The solenoid 48 includes a movable armature assembly 226 and includes a plunger 228 connected thereto and is actuated by energization of a plurality of windings 230 connected to conductor 32 from module 26. The armature assembly 226 includes spring 236 located at its outer end and engageable with an end cap 234 on housing assembly 161. Upon energization of the solenoid 48, the armature 226 is drawn inwardly into cavity 238 in solenoid 48 moving the plunger 228 inwardly. Plunger 228 engages cap 156 and will move the cap 156 inwardly into cylinder 144. By movement of the cap 156 into the cylinder 144, the annular seal 160 will be moved from sealing washer 146 opening a path therearound; at the same time the cap 156 will be moved into engagement with the radial surface of counterbore 165 in sealing washer 164 wherein the radial path 178 will be closed. With path 178 closed one of the vacuum paths from the section 54 to the section 50 will have been closed. At the same time, a fluid path is defined in the space now between the seal 160 and the sealing washer 146 and air under pressure will flow through the voids between the projections 182 and 186 and through the path 190. The air pressure on the flexible sealing flange 188 will cause it to deflect into sealing engagement with the outer end of the couterbore 159 thereby closing the fluid path 174 resulting in the second fluid path to vacuum being closed. A path for the atmosphere air is provided around the flange 188 via the path 192 into the bores 176. The air under pressure will deflect the seal 202 away from the bores 176 whereby air can rapidly move into the section 50 moving the diaphragm 112 and power plate 120 inwardly into the section 54. As this occurs and as the diaphragm 112 is moved away from the throttle valve assembly 200, the conical coil spring member 216 will no longer be engaged and the spring 210 will then force the seal support 206 and flexible seal 202 outwardly away from the openings 176 completely opening the air path to section 50. In FIG. 2, the throttle valve 200 will be maintained in this position during the portion of the curve from $d$ to $e$ on the brake pressure curve. As the wheels spin up and the signal $y$ from the module 26 is discontinued, the solenoid 48 will be deenergized permitting the return of plunger 228 back to its original position (as shown in FIG. 5) with the spring 152 moving the cap 156 out of sealing engagement with the sealing washer 164 and again moving the seal 160 into engagement with the sealing washer 146, thereby closing the path to atmospheric air. At this time the two paths to vacuum are opened thereby permitting the spring 128 to move the diaphragm assembly 110 quickly toward its closing position. As this occurs the piston 46 will be moved again into the cylinder 62 thereby reducing the aavilable volume of cylinder 62 causing pressure to be reapplied to the brakes. This occurs rapidly as indicated on the curve of FIG. 2 from point $e$ to point $f$. As the diaphragm assembly 42 approaches its end position, it engages the conical spring 216 causing the throttle valve 200 to be moved to its position in which the flexible valve seal 202 closes the bores 176. At this time the air remaining in section 50 will be returned to vacuum through the bleed hole 204. The bleed hole 204 offers a substantial restriction to flow of air which results in a throttling effect or a slowing down of the return of the diaphragm assembly 42. This also slows down the return of the hydraulic piston 46. The throttling effect occurs at the point $f$ on the curve of FIG. 2 and results in the brake pressure being reapplied at a reduced rate as shown from point $f$ to point $g$ to simulate the ideal curve B. The throttling effect will continue either until the diaphragm assembly 42 has reached its final position or until another output signal $y$ is received from the control module 26.

As previously noted, two vacuum paths to the cylinder 144 were provided one including annular path 174, another including annular path 190. In evacuating the air from the section 50 upon the actuation of the solenoid 48 in order to provide for a quick return of the diaphragm assembly 42 (point $e$ to point $f$ of the curve of FIG. 2), it is necessary that the path to the cylinder 144 and hence to the section 54 be generally unrestricted. The second path including the path 190, the axial path 180, and radial path 178 is somewhat restricted specifically through the radial path 178. In order to increase the area of the path 178, it would be necessary to increase the gap between the cap 156 and the radial surface of the counterbore of the seal member 164. In closing this first path, to admit air under pressure, the increased gap would require that the plunger 228 of the solenoid 48 move farther to a closed position. As the distance of travel of the plunger 228 is increased, the required size of the solenoid 48 increases; in order to maintain the solenoid 48 at a minimum size the radial path 178 can be made of a minimum size and the second fluid path including the annular path 174 and the grooves 172 will provide adequate flow for evacuation of air from section 50. However, the second path must also be closed during the admission of air under pressure; this is accomplished by the flexible flange portion 188 which is deflected to a closed position as air pressure is applied through paths 190 and 192 to the section 50.

Depending upon the conditions of the road and the fluid requirements of the brake system (due to fade, etc.) the ideal curve B may shift and the curve C may also change. It is desirable that curve C follow ideal curve B. The bleed valve assembly 100 aids in this regard. As the piston 46 is moved back to its original position upon de-energization of the solenoid 48, it engages the stem 102 of the bleed valve assembly 100 prior to engagement with the stem 82 of the check valve 78. When this occurs fluid from the master cylinder 20 to the fluid line 18 will gradually be applied to the wheel brake cylinders 12 through the restricted path defined by the slight clearance between the bore 104 and the stem 102. This will permit a gradual increase in the brake pressure from the point $g$ to the point $h$ (FIG. 2) and result in curve C closely following curve B even when an increase in brake pressure or more fluid is required by the system. If the bleed valve 100 were not utilized and if additional pressure were required by the system before the occurrence of another skid condition, then when the piston 46 opened the check valve 76 a sharp increase in pressure from point $g$ to point $k$ (FIG. 2) would occur resulting in a substantial departure from the ideal curve B. The pressure differentials between point $d$ and point $e$ and point $d$ and point $f$ are substantially fixed since for each actuation of valve 24 the piston 46 is moved the same maximum distance out of cylinder 62. The point $g$, however, is not fixed and can change in magnitude depending on the condition existing. Thus by reaching the point $k$ the entire curve C would be raised (since differentials $d$ to $e$ and $e$ to $f$ are fixed) and the excursions of that curve would be farther from the ideal curve B (or one of the family of curves B). By use of the bleed valve assembly 100 in combination with follow ideal curve B. The bleed valve assembly 100 aids in this regard. As the piston 46 is moved back to its original position upon de-energization of the solenoid 48, it engages the stem 102 of the bleed valve assembly 100 prior to engagement with the stem 82 of the check valve 78. When this occurs fluid from the master cylinder 20 to the fluid line 18 will gradually be applied to the wheel brake cylinders 12 through the restricted path defined by the slight clearance between the bore 104 and the stem 102. This will permit a gradual or controlled increase in the brake pressure from the point $g$ to the point $h$ (FIG. 2) and result in curve C closely following curve B even when an increase in brake pressure or more fluid is required by the system. If the bleed valve 100 were not utilized and if additional pressure were required by the system before the occurrence of another skid condition, then when the piston 46 opened the check valve 76 a sharp or uncontroled increase in pressure from point $g$ to point $k$ (FIG. 2) would occur resulting in a substantial departure from the ideal curve B. The pressure differentials between point $d$ and point $e$ and point $d$ and $f$ are substantially fixed since for each actuation of valve 24 the piston 46 is moved the same maximum distance out of cylinder 62. The point $g$, however, is not fixed and can change in magnitude depending on the condition existing. Thus, by reaching the point $k$ the entire curve C would be raised (since differentials $d$ to $e$ and $e$ to $f$ are fixed) and the excursions of that curve would be farther from the ideal curve B (or one of the family of curves B). By use of the bleed valve assembly 100 in combination with check valve 76, the modulating valve 24 will provide a brake pressure curve C closely approximating the ideal brake pressure.

In order to closely approximate the curve B the time from point $d$ to point $e$ is held to a minimum and the time from point $e$ to point $f$ is also held to a minimum; however, the time from point $f$ to point $g$ is made substantially longer since that part of the operational cycle (point $d$ to point $g$) closely follows the curve B. Thus over the total elapsed time of the operational cycle ($d$ to $g$) a good portion of the time is at pressures close to the ideal. In one embodiment the pressure use from point $e$ to point $f$ was at a rate of around 10,000 p.s.i./sec. while the use from point $f$ to point $g$ was at a rate of around 500 p.s.i./sec. and this was found to be highly satisfactory. Thus a ratio of rates of around 20:1 was found to be desirable. While the system would work at ratios substantially less than 20:1, it is desirable for better performance not to operate at a ratio less than around 15:1.

A further improvement in operation and a closer proximity of curve C to the ideal curve B can be provided by the utilization of a variable orifice or variable restriction throttling valve in place of the throttling valve 200.

Looking now to FIG. 11, a modified modulating valve 24a is shown in which a variable orifice throttling valve 200a is used. In the description of the embodiment of FIG. 11 components similar to like components in the valve 24 previously described have been given the same numerical designation with the addition of the latter subscript $a$. In FIG. 11 the modulating valve 24a has the valve seal 202a fixed to the chamber section 116a; no bleed hole (such as 204) is used; instead the throttle valve 200a has a pin 250 used in conjunction with an opening 252 in a valve plate 254. The plate 254 is movably connected with pin 250 and seals a cavity 256 located in the chamber section 116a. The cavity 256 is ported to the slotted bores 176a by a port 258. The pin 250 is connected to the power plate 120a via a threaded assembly 260 and with the diaphragm assembly 42a in its deactuated position as shown in FIGS. 3, 5 and 11, the pin 250 provides a minimum clearance with the bore 252, serving the same function as the bleed hole 204 in the embodiment of FIG. 8. Upon actuation the flexible seal valve 202a will be deflected by the air pressure in bores 176a whereby the section 50a will be pressurized causing actuation of the diaphragm assembly 42a. During the actuation stroke of diaphragm assembly 42a the valve plate 254 will be moved away from the opening of cavity 256. In this position, a spring 263 will hold the plate 254 against an enlarged head 264 at the end of pin 250. On the return stroke of the diaphragm assembly 42a air can be evacuated from the chamber section 50a only through the cavity 256 since the flexible valve seal 202a will be closed; at the point $f$ on curve of FIG. 2 the diaphragm assembly 42a will have returned partially and the valve plate 254 will be moved into position to block the opening of cavity 256. In this regard, spring 263 functions in a manner similar to that of the conical spring 216 and hence the cavity 256 will be closed prior to the end of the stroke of the diaphragm assembly 42a and further return movement will result in compression of spring 263. The pin 250 has a tapered portion 262 near the head 264. Initially with the valve plate 254 closing the cavity 256, the minimum diameter of the tapered portion 262 on the pin 250 is located in alignment with the orifice 252 providing for maximum clearance and permitting greater air flow than that as provided, for example, by the bleed hole 204 in the embodiment of FIG. 8. However, upon continued movement of the diaphragm assembly 42a back to its end position, the clearance with the orifice 252 decreases as the tapered portion 262 is moved therein until the enlarged portion of the pin 250 is located in alignment with the orifice 252 resulting in the minimum clearance and hence the maximum restriction. The result is that the curve after the point f will have a knee or curved portion generally indicated as m which will more closely approximate the ideal brake pressure curve B; the variable throttle valve 200a, as shown in FIG. 11, permits tailoring to provide a better approximation to the ideal curve B.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a skid control system for controlling fluid pressure actuated brakes of at least one wheel of a wheeled vehicle by controlling the fluid pressure to the brakes, said system comprising control means providing an output signal in response to the detection of a skid condition at the one wheel at a fluid pressure of a first magnitude and modulating means actuable from a different source of fluid pressure and having a control cycle determined by variations in the fluid pressure from the different source and actuable in response to said output signal for initiating said control cycle with said cycle including relieving the fluid pressure to a seocnd magnitude below said magnitude at which the skid condition will be relieved and rapidly increasing the magnitude of fluid pressure towards a third magnitude between said first and said second magnitude and subsequently gradually increasing the magnitude of fluid pressure towards said first magnitude, said modulating means increasing the magnitude of fluid pressure from said second magnitude to said third magnitude at a first rate and increasing the magnitude of fluid pressure from said third magnitude towards said first magnitude at a second rate, said first rate being substantially higher than said second rate and with said modulating means increasing the fluid pressure from said first rate to said second rate at an intermediate rate, said first and second rates being approximately in the ratio of no less than around 20.

2. The system of claim 1 with said third magnitude of fluid pressure being selected to be proximate to a magnitude of fluid pressure at which slip of the wheel is approximately between 10 to 20%.

3. The system of claim 2 with the difference in pressure between said first, second and third magnitude being substantially fixed.

4. The system of claim 1 for operation from a source of pressurizable fluid with said modulating means blocking additional fluid to the brakes at the initiation and generally throughout said control cycle and permitting additional fluid at a substantially restricted rate to be transmitted to the brakes from the source proximate the end of said control cycle.

5. In a skid control system for controlling the fluid pressure applied to the brakes of at least one wheel of a wheeled vehicle from a source of fluid pressure, a modulating valve for controlling the fluid pressure from the source to the brakes comprising: pressure control means operable to control the magnitude of fluid pressure to the brakes, actuating means actuable to operate said pressure control means, said pressure control means having a first condition for relieving the fluid pressure to the brakes and a second condition not relieving the fluid pressure to the brakes and intermediate conditions from said first to said second conditions in which the fluid pressure is reapplied to the brakes, said actuating means operable with said pressure control means and actuable in response to a control signal for rapidly placing said pressure control means in said first condition and for rapidly placing said pressure control means in one of said intermediate conditions and gradually operating said pressure control means toward said second condition, the first rate of operation of said pressure control means from said first condition to said one intermediate condition being substantially greater than the second rate of operation of said pressure control means from said one intermediate condition towards said second condition, said pressure control means including check valve means for blocking the fluid pressure from the source to the brakes in said first and intermediate conditions, said pressure control means including bleed valve means for permitting restricted flow from the source to the brakes at an intermediate condition after said one intermediate condition and before said second condition.

6. The modulating valve of claim 5 with said first rate and said second rate being in the ratio of no less than approximately 20:1.

7. The modulating valve of claim 5 with said actuating means comprising a fluid actuated first piston.

8. The modulating valve of claim 5 including throttling valve means operable to provide said second rate of operation.

9. The modulating valve of claim 8 with said actuating means comprising a fluid actuated first piston and valve means having one condition for communicating opposite sides of said piston together and another condition for blocking said opposite sides.

10. The modulating valve of claim 9 with said valve means normally being in said one condition and being placed in said second condition upon actuation of said actuating means.

11. The modulating valve of claim 10 with said first piston being pneumatically actuated and with said valve means in said one condition adapted to communicate said opposite sides to vacuum and in said another condition blocking the communication between said opposite sides and connecting one side to atmospheric air.

12. The modulating valve of claim 11 with said valve means being solenoid actuated from said one to said another condition and with said valve means defining two paths for communicating said opposite sides together in said one condition and a third path communicating said one path to atmosphere in said another condition, one of said two paths being closed by actuation of said solenoid and defining a passageway of a minimum cross-section and said third path being opened by actuation of said solenoid, the other of said two paths being closed by air pressure in said third path, said two paths with said valve means in said one condition defining a total passageway communicating said opposite sides with substantially little restriction.

13. The modulating valve of claim 12 with said third path including a part of said other path and with said valve means comprising a flexible seal member for closing said one path in response to the air pressure with said valve means in said other condition.

14. The modulating valve of claim 13 with said pressure control means including a second piston movably located in a relief cylinder located in the fluid circuit between the source and the brakes and with the source providing hydraulic fluid pressure, means connecting said second piston and said first piston for movement into and out from said relief cylinder in response to movement of said first piston, said check valve means and said bleed valve means being located in the fluid circuit between the source and the brakes and being actuable by said second piston.

15. The modulating valve of claim 14 with said throttling valve means being in said two paths and said third path and being actuable for throttling the evacuation of air from said one side of said first piston when said first piston is in a preselected position at which said pressure control means is in said one intermediate condition.

16. The modulating valve of claim 15 with said throttling valve means providing for a fixed restriction to evacuation of air.

17. The modulating valve of claim 16 with said throttling valve means providing for a variable restriction to evacuation of air with said restriction decreasing as said first piston is moved to its originally deactuated position.

18. In a skid control system for controlling hydraulically actuated brakes of at least one wheel of a wheeled vehicle operable from a source of hydraulic pressure by controlling the hydraulic pressure to the brakes, said system comprising control means providing an output signal in response to the detection of a skid condition at the one wheel at a fluid pressure of a first magnitude and modulating means actuable in response to said output signal for relieving the hydraulic pressure to a second magnitude below said first magnitude at which the skid condition will be relieved and then increasing the magnitude of hydraulic pressure towards said first magnitude, said modulating means including flow means in communication with the hydraulic pressure, said flow means including a first hydraulic control valve actuable to one condition for blocking fluid pressure from the source to the brakes during the control cycle of pressure release and reapplication and to a second condition for communicating the source to the brakes at the completion of said control cycle, said flow means further including a hydraulic bleed means actuable near the end of said control cycle and with the pressure near said first magnitude to permit additional fluid at a substantially restricted rate to be transmitted to the brakes from the source whereby a sudden reapplication of full pressure from the source to the brakes is avoided.

19. The system of claim 18 with said first control valve comprising a check valve and with said bleed means comprising a separate bleed valve.

References Cited

UNITED STATES PATENTS

| | | | |
|---|---|---|---|
| 2,417,211 | 3/1947 | Newell | 303—21 |
| 3,093,422 | 6/1963 | Packer et al. | 303—21 |
| 3,260,556 | 7/1966 | Packer | 303—21 |
| 3,306,677 | 2/1967 | Dewar et al. | 303—21 |
| 3,403,945 | 10/1968 | Dewar et al. | 303—21 |

MILTON BUCHLER, Primary Examiner

JOHN J. McLAUGHLIN, JR., Assistant Examiner

U.S. Cl. X.R.

188—181; 303—6, 61

UNITED STATES PATENT OFFICE
CERTIFICATE OF CORRECTION

Patent No. 3,515,440        Dated June 2, 1970

Inventor(s) Peter Every et al.

It is certified that error appears in the above-identified patent and that said Letters Patent are hereby corrected as shown below:

Column 4, line 38, "atmospheric" should read -- atmosphere --; line 57, after "with" insert -- an --. Column 5, line 67, after "curve" insert -- from --. Column 8, line 23, "atmosphere" should read -- atmospheric --; line 48, "aavilable" should read -- available --. Column 9, line 34, after "gradual" insert -- or controlled --; line 41, after "sharp" insert -- or uncontrolled --. Column 11, line 31, after "said" insert -- first --; line 34, "magnitude" should read -- magnitudes --; line 46, "20" should read -- 20:1 --; line 51, "difference" should read -- differences --.

Signed and sealed this 17th day of November 1970.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,515,440            Dated June 2, 1970

Inventor(s) Peter Every and William Stelzer

It is certified that error appears in the above-identified patent and that said Letters Patent are hereby corrected as shown below:

Column 9, line 53, delete "follow ideal curve B. The bleed valve"; Column 9, lines 54-75, delete in their entirety. Column 10, lines 1-7, delete in their entirety.

SIGNED AND
SEALED
JAN 5 1971

(SEAL)
Attest:

Edward M. Fletcher, Jr.
Attesting Officer

WILLIAM E. SCHUYLER, JR.
Commissioner of Patents